United States Patent
Pasquero et al.

(10) Patent No.: US 9,665,266 B2
(45) Date of Patent: May 30, 2017

(54) SETTING REMINDERS FROM AN INSTANT MESSAGING APPLICATION

(75) Inventors: Jerome Pasquero, Kitchener (CA); Steven Henry Fyke, Waterloo (CA); David Ryan Walker, Waterloo (CA)

(73) Assignee: BlackBerry Limited, Waterloo (CA)

( * ) Notice: Subject to any disclaimer, the term of this patent is extended or adjusted under 35 U.S.C. 154(b) by 386 days.

(21) Appl. No.: 13/282,825

(22) Filed: Oct. 27, 2011

(65) Prior Publication Data
US 2013/0110940 A1    May 2, 2013

(51) Int. Cl.
G06F 3/0488 (2013.01)
H04M 1/725 (2006.01)
H04L 12/58 (2006.01)
H04W 4/12 (2009.01)

(52) U.S. Cl.
CPC .......... *G06F 3/0488* (2013.01); *H04L 51/04* (2013.01); *H04M 1/72552* (2013.01); *H04M 1/72566* (2013.01); *H04M 1/72572* (2013.01); *H04W 4/12* (2013.01)

(58) Field of Classification Search
CPC  H04M 1/72552; H04M 1/72566; H04W 4/12
USPC ........................................ 709/206, 217, 250
See application file for complete search history.

(56) References Cited

U.S. PATENT DOCUMENTS

| | | | | |
|---|---|---|---|---|
| 5,555,376 A * | 9/1996 | Theimer et al. | ............... | 709/229 |
| 5,897,635 A * | 4/1999 | Torres et al. | | |
| 5,938,721 A * | 8/1999 | Dussell et al. | ................. | 701/468 |
| 6,044,395 A * | 3/2000 | Costales et al. | ............... | 709/206 |
| 6,320,534 B1 * | 11/2001 | Goss | ......................... | 342/357.29 |
| 6,351,771 B1 * | 2/2002 | Craddock et al. | ............ | 709/227 |
| 6,430,602 B1 * | 8/2002 | Kay et al. | ...................... | 709/206 |
| 6,446,004 B1 * | 9/2002 | Cao et al. | ...................... | 701/482 |
| 6,484,033 B2 * | 11/2002 | Murray | ....................... | 455/456.3 |
| 6,505,048 B1 * | 1/2003 | Moles et al. | .................. | 455/456.1 |
| 6,526,352 B1 * | 2/2003 | Breed et al. | ................... | 701/470 |
| 6,560,530 B1 * | 5/2003 | Yamada et al. | ............... | 701/532 |
| 6,571,279 B1 * | 5/2003 | Herz | ................. | G06F 17/30867 |
| | | | | 707/999.01 |
| 6,594,483 B2 * | 7/2003 | Nykanen et al. | .............. | 455/411 |
| 6,650,902 B1 * | 11/2003 | Richton | ...................... | 455/456.3 |
| 6,668,173 B2 * | 12/2003 | Greene | ......................... | 455/445 |
| 6,678,613 B2 * | 1/2004 | Andrews et al. | ............. | 701/468 |
| 6,798,755 B2 * | 9/2004 | Lillie et al. | .................... | 370/312 |
| 7,092,498 B2 * | 8/2006 | Hariri et al. | ............... | 379/93.01 |
| 7,136,919 B1 * | 11/2006 | Foncarnier | ..................... | 709/224 |
| 7,139,820 B1 * | 11/2006 | O'Toole et al. | .............. | 709/223 |
| 7,433,680 B2 * | 10/2008 | Jenkins et al. | ............. | 455/412.1 |

(Continued)

OTHER PUBLICATIONS

Ev Williams (@ev); How @replies work on Twitter; May 12, 2008; Twitter Blog; 5 Pages.*

(Continued)

*Primary Examiner* — Azizul Choudhury
(74) *Attorney, Agent, or Firm* — Moffat & Co.

(57) ABSTRACT

A method for providing a reminder from within an instant messaging application executing on a computing device, the method comprising receiving textual input from within the instant messaging application. In response to receiving the textual input, a reminder-triggering condition is determined based on a predetermined symbol within the textual input. An instant message is sent that includes the reminder-triggering condition for the reminder.

17 Claims, 16 Drawing Sheets

(56) References Cited

U.S. PATENT DOCUMENTS

| | | | |
|---|---|---|---|
| 7,447,165 B1* | 11/2008 | Sylvain | 370/254 |
| 7,519,678 B1* | 4/2009 | Haley | G06F 15/16 709/203 |
| 7,689,524 B2* | 3/2010 | Ozzie et al. | 706/45 |
| 7,809,805 B2* | 10/2010 | Stremel et al. | 709/219 |
| 2001/0005171 A1* | 6/2001 | Farringdon et al. | 340/573.1 |
| 2002/0034969 A1* | 3/2002 | Sundstrom | 455/566 |
| 2002/0075305 A1* | 6/2002 | Beaton et al. | 345/751 |
| 2002/0086680 A1 | 7/2002 | Hunzinger | |
| 2002/0183077 A1* | 12/2002 | Fomukong | 455/456 |
| 2003/0005060 A1 | 1/2003 | Davidson et al. | |
| 2003/0143994 A1* | 7/2003 | Kimura et al. | 455/422 |
| 2003/0153310 A1* | 8/2003 | Ishii | 455/435 |
| 2003/0219104 A1* | 11/2003 | Malik | 379/88.11 |
| 2003/0224762 A1* | 12/2003 | Lau et al. | 455/412.2 |
| 2003/0225589 A1* | 12/2003 | Eaton et al. | 705/1 |
| 2004/0116105 A1* | 6/2004 | Jeong | 455/412.1 |
| 2004/0203902 A1* | 10/2004 | Wilson | H04W 64/00 455/456.1 |
| 2004/0207522 A1* | 10/2004 | McGee et al. | 340/539.13 |
| 2005/0273493 A1* | 12/2005 | Buford et al. | 709/204 |
| 2006/0161599 A1* | 7/2006 | Rosen | 707/201 |
| 2006/0166686 A1* | 7/2006 | Kim | 455/466 |
| 2007/0061718 A1* | 3/2007 | Nurmi | 715/542 |
| 2007/0149213 A1* | 6/2007 | Lamba et al. | 455/456.1 |
| 2007/0188319 A1 | 8/2007 | Upton | |
| 2007/0192299 A1* | 8/2007 | Zuckerberg et al. | 707/3 |
| 2007/0198698 A1* | 8/2007 | Boyd et al. | 709/224 |
| 2007/0241885 A1 | 10/2007 | Clipsham | |
| 2007/0270129 A1 | 11/2007 | Luo | |
| 2007/0280464 A1* | 12/2007 | Hughes et al. | 379/205.01 |
| 2008/0090597 A1* | 4/2008 | Celik et al. | 455/466 |
| 2008/0214209 A1 | 9/2008 | Ratnaker | |
| 2008/0303811 A1* | 12/2008 | Van Luchene | 345/419 |
| 2009/0061833 A1* | 3/2009 | Ho et al. | 455/414.2 |
| 2009/0106365 A1* | 4/2009 | Drory et al. | 709/206 |
| 2009/0164639 A1* | 6/2009 | Sylvain | 709/227 |
| 2009/0167554 A1* | 7/2009 | Munje et al. | 340/825.49 |
| 2009/0212980 A1* | 8/2009 | Hisada | 341/28 |
| 2009/0265781 A1* | 10/2009 | Prehofer et al. | 726/22 |
| 2009/0319616 A1* | 12/2009 | Lewis, II | H04W 24/00 709/206 |
| 2010/0042522 A1* | 2/2010 | O'Brien et al. | 705/34 |
| 2010/0130132 A1* | 5/2010 | Lee et al. | 455/41.3 |
| 2010/0152949 A1* | 6/2010 | Nunan et al. | 701/29 |
| 2010/0231526 A1* | 9/2010 | Kawabata | 345/173 |
| 2010/0295676 A1 | 11/2010 | Khachaturov et al. | |
| 2010/0295726 A1* | 11/2010 | Tann | 342/357.24 |
| 2010/0332668 A1* | 12/2010 | Shah et al. | 709/229 |
| 2011/0106892 A1* | 5/2011 | Nelson et al. | 709/206 |
| 2011/0112881 A1* | 5/2011 | Malhotra et al. | 705/7.21 |

OTHER PUBLICATIONS

European Search Report for corresponding EP application 11186831.1 dated Dec. 2, 2011.

JotYou—Location Based Mobile Messaging. www.jotyou.com/JotYou/.

www.twitter.com/timer -.

* cited by examiner

SETTING REMINDERS FROM AN INSTANT MESSAGING APPLICATION

CROSS-REFERENCE TO RELATED APPLICATIONS

This is the first application filed for the present technology.

TECHNICAL FIELD

The present technology relates generally to communication systems and methods and, in particular, to techniques for instant messaging.

BACKGROUND

Instant messaging (IM) provides for real-time text-based communication between online users whose devices are running the same IM client. In addition to exchanging instant messages in an IM session, instant messaging applications typically enable a user to chat with multiple buddies at once, to manage a buddy list, to upload a photo or avatar, and to share links and files. Despite these features, the capabilities of most instant messaging applications remain fairly rudimentary.

For example, instant messaging applications generally provide no means to provide time-based reminders or location-based reminders. Using conventional technologies, the IM user must switch to a different application to set or send such a reminder.

Accordingly, it would be highly desirable to provide a technology that would enable reminders to be generated from within an instant messaging application in a simple and intuitive manner.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
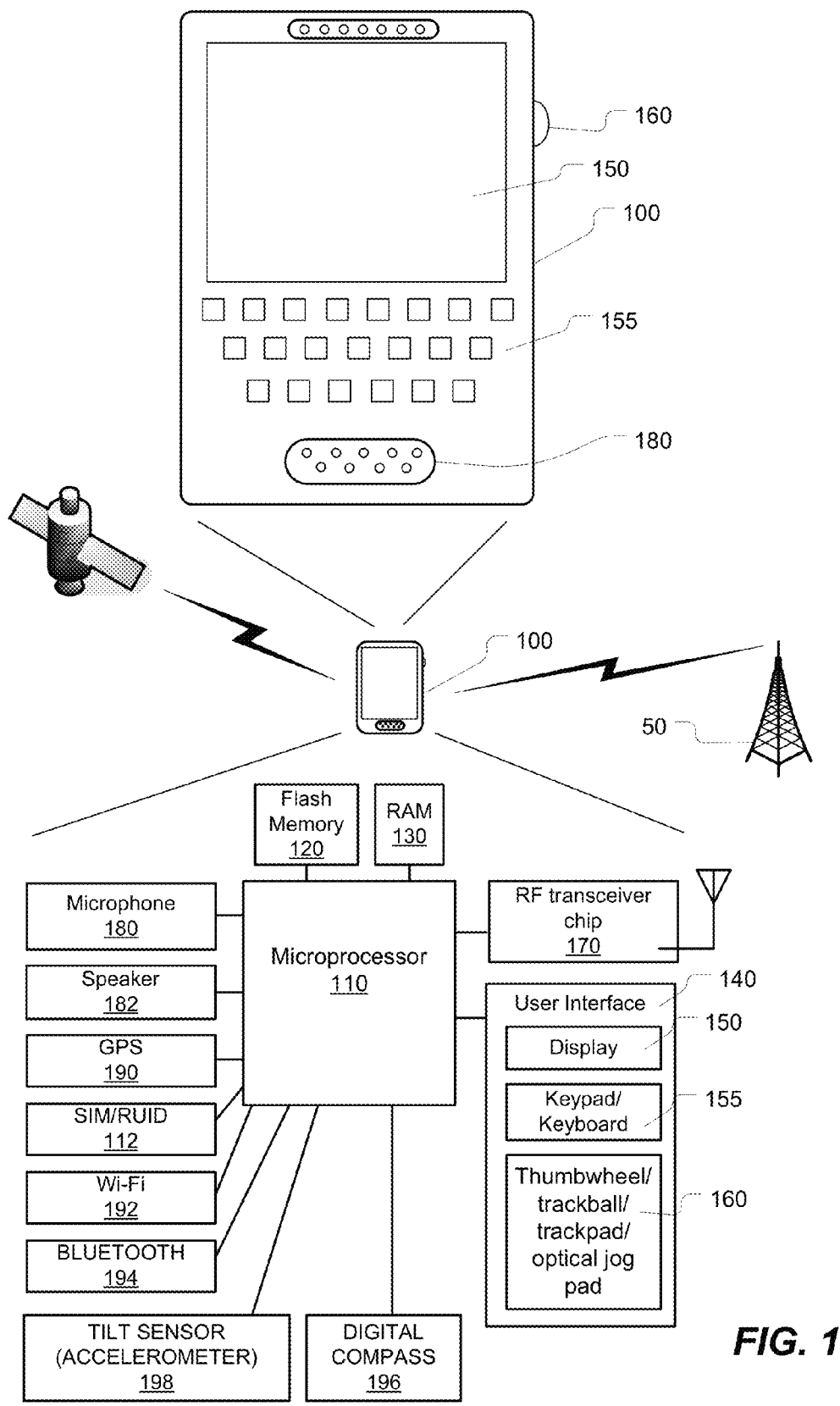
FIG. 1 is a depiction of a mobile device as one example of a computing device that may be used to implement the present technology.

The present technology enables an instant messaging application to provide reminders. Reminders may be sent to others (i.e. to other devices) or to oneself (i.e. to one's own device). These reminders may be location-based reminders, proximity-based reminders (proximity to a contact) or time-based reminders. These reminders may be sent in response to two or more conditions (location, contact proximity and time) being satisfied. In some implementations, the reminders are generated by inputting a predetermined symbol, character or string as part of the textual input. The computing device recognizes the predetermined symbol and creates the reminder-triggering condition. Different symbols may be used for different types of reminders. A single symbol or character provides for a simple and intuitive means for creating these reminders. For example, an @ symbol may be used for location-based reminders whereas an & symbol may be used for contact-proximity-based reminders. A time-based reminder may be generated when numeric input is associated with a predetermined symbol. Upon satisfaction of the reminder-triggering condition, an instant message is sent. The instant message may contain a reminder message drawn from the textual input. This innovative technique enables reminders to be created in a simple and intuitive manner within an instant-messaging environment by using predetermined symbols or syntax.

Accordingly, one aspect of the present technology is a method for setting a reminder from within an instant messaging application executing on a computing device. The method entails determining a reminder-triggering condition based on a predetermined symbol within textual input received by the instant messaging application and sending an instant message that includes the reminder-triggering condition for the reminder.

Another aspect of the present technology is a computer-readable medium comprising instructions in code which when loaded into a memory and executed by a processor of a computing device cause the computing device to determine a reminder-triggering condition based on a predetermined symbol within textual input received by the instant messaging application and send an instant message that includes the reminder-triggering condition for a reminder.

Another aspect of the present technology is a computing device having a memory for storing data for an instant messaging application, a processor operatively coupled to the memory to execute the instant messaging application, a user interface for receiving textual input for the instant messaging application, wherein the processor, in response to receiving the textual input via the user interface, is configured to determine a reminder-triggering condition based on a predetermined symbol within the textual input, and a transceiver for transmitting an instant message that includes the reminder-triggering condition for a reminder.

The details and particulars of these aspects of the technology will now be described below, by way of example, with reference to the attached drawings.

By way of overview, the present technology enables reminders to be provided via an instant messaging application executing on a computing device. FIG. 1 is a schematic depiction of a mobile device as one example of such a computing device. This computing device, which is generally designated by reference numeral 100, includes a processor 110 and memory 120, 130 for executing the instant messaging application. The memory may include flash memory 120 and/or random access memory (RAM) 130. Other types or forms of memory may be used.

The computing device 100 includes a user interface 140 for interacting with the instant messaging application (e.g. for inputting text and for displaying the text of messages being composed, messages that have been sent and messages that have been received). The computing device 100 may include one or more input/output devices or user interfaces 140, such as a display screen 150 (e.g. a small LCD screen or touch-sensitive display screen), and a keyboard or keypad 155. The user interface may also include a thumbwheel, trackball, trackpad or optical jog pad 160.

The computing device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the computing device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

Alternatively, where the computing device is a wired device like a desktop computer, laptop, etc., the transceiver 170 of the computing device 100 may be a modem or equivalent (for wired communications) using, for example, the TCP/IP protocol for Internet data communication. The computing device 100 may also include one or more ports for wired connections, e.g. USB, HDMI, FireWire (IEEE 1394), etc.

Optionally, the computing device may include a microphone 180 and a speaker 182 (and optionally an earphone jack) for telephony.

The computing device may also optionally include a positioning subsystem such as a Global Positioning System (GPS) receiver 190 (e.g. in the form of a chip or chipset) for receiving GPS radio signals transmitted from one or more orbiting GPS satellites. Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLO-NASS system, India's proposed Regional Navigational Satellite System (IRNSS), and Japan's proposed QZSS regional system.

The computing device 100 may optionally include a Wi-Fi™ transceiver 192 and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver. The computing device may optionally include other sensors like a digital compass 196 and/or a tilt sensor 198.

As noted above, a mobile device or wireless communications device is one example of a computing device 100 on which the present technology may be implemented. Other computing devices 100 may include desktop personal computers, laptops, palmtops, tablets, game consoles, or other such devices having instant messaging capabilities. As noted above, the technologies disclosed herein may be employed on either wireless or wired devices.

The novel computing device 100 is configured to enable an instant messaging application to provide reminders, either to oneself (by sending an instant message to one's own device to cause the device to set the reminder) or to others (by sending an instant message to a recipient device associated with a buddy, contact or friend for setting the reminder on the recipient device). In a variant, the instant message may be multicast to multiple recipient devices (e.g. in a group chat) for setting the same reminder on multiple recipient devices.

To implement this novel technology, the memory 120, 130 of the computing device 100 stores data for an instant messaging (IM) application (or IM client). The processor 110, which is operatively coupled to the memory 120, 130, executes the instant messaging application (or IM client). The user interface 140 of the computing device 100 receives textual input for the instant messaging application executing on the computing device. In most implementations, the user interface 140 will include a keyboard, keypad or touch-screen virtual keyboard/keypad to enable the user to type, input, or otherwise enter alphanumeric characters, symbols, smiley-face icons, etc. Entry of textual input may also be achieved using other UI technologies such as, for example, a speech-to-text (speech recognition) module or a handwriting recognition module (that recognizes characters or symbols written on a touch-screen using a stylus).

The processor 110, in response to receiving the textual input via the user interface 140, determines a reminder-triggering condition based on a predetermined symbol within the textual input. The predetermined symbol may be a special character or symbol such as, for example, @, #, $, &, *, +, etc. Alternatively, a string of predetermined symbols or characters may be used, e.g. _@@, _&&, @LOC, @TIM, +PROX, etc. Detecting the predetermined symbol may be accomplished by parsing the textual input as it is entered.

The reminder-triggering condition is a condition that will cause the reminder to be triggered once the reminder has been received, processed and set up on the recipient device. The recipient device monitors the reminder-triggering condition. Upon satisfaction of the reminder-triggering condition, the reminder is provided. Providing the reminder may involve displaying reminder text onscreen and/or sounding a reminder alert.

The reminder-triggering condition may be location-based and/or time-based. The reminder-triggering condition may also be based on the proximity of the computing device to a mobile device or other computing device associated with a contact, buddy or friend. The reminder-triggering condition may be a simple condition (e.g. only location, only proximity, only time) or a complex or compound condition that is a logical combination of multiple conditions (e.g. the reminder is provided if both the location condition and the time condition are met).

In the main implementations disclosed above, the instant message is sent to the recipient device to cause the recipient device, upon receipt of the IM, to set up the reminder in the memory of the recipient device. The recipient device then monitors the reminder-triggering condition and causes the reminder to be provided at the correct time and place. In other words, the IM is delivered and stored on the recipient device until the reminder-triggering condition is met. The recipient device determines if the condition is met. The reminder, which is stored on the recipient device, is then provided upon satisfaction of the reminder-triggering condition. A copy of the reminder can also be stored on a server so that the server and device are synchronized. This enables data recovery if the device memory is wiped, or if the device is destroyed or lost.

In another implementation, the sending device may set its own reminder based on the reminder-triggering condition to send a further (second) instant message upon satisfaction of the reminder-triggering condition. This second instant message may serve as a further reminder.

In another implementation, after the send command is received, delivery of the IM may be delayed (i.e. the IM reminder is stored, cached or buffered on the sending device or at a server) until the reminder-triggering condition is satisfied. In this case, the processor 110 determines if the reminder-triggering condition is satisfied. The transceiver 170 of the computing device then transmits the instant message as a reminder in response to the reminder-triggering condition being satisfied.

Figure 2:
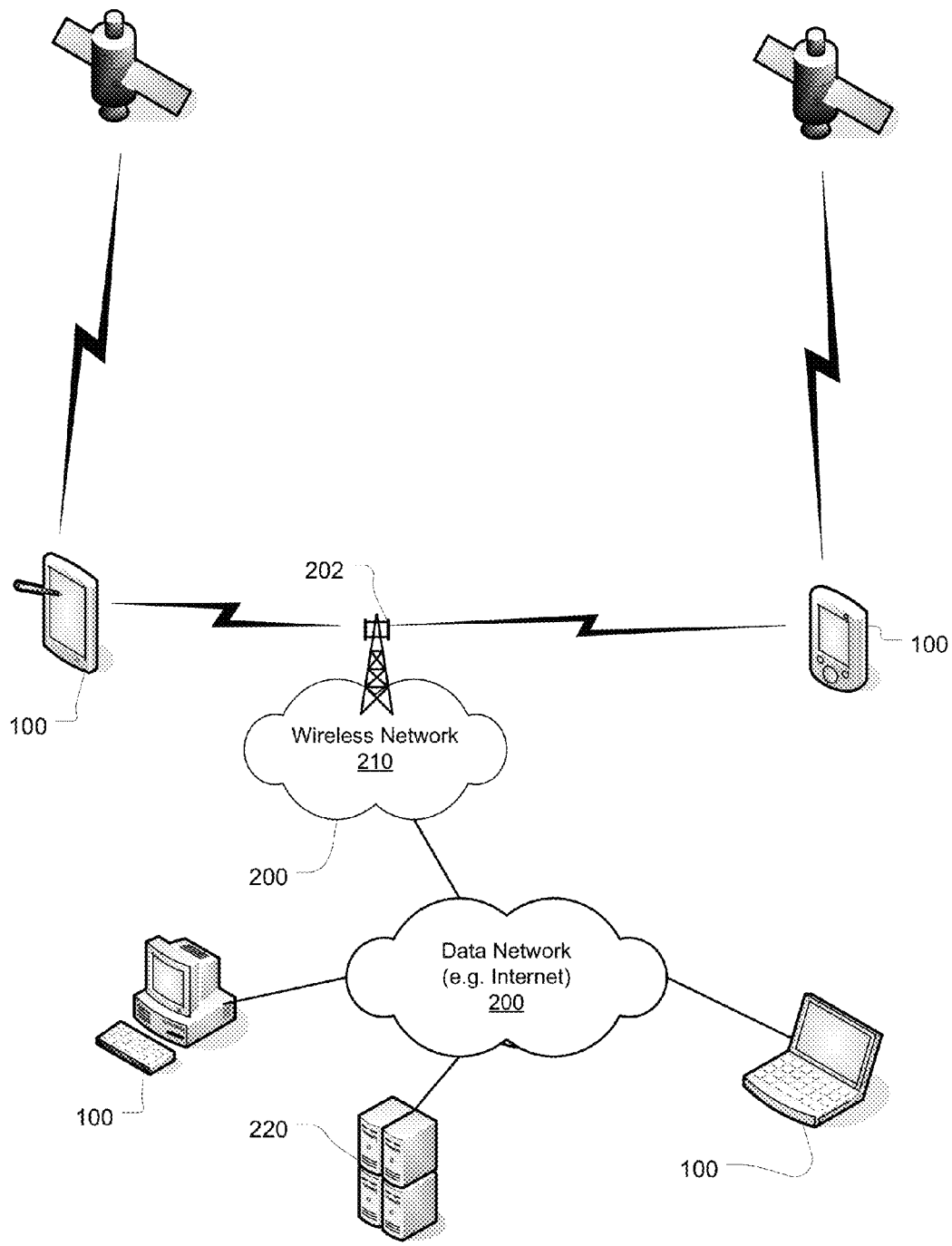
FIG. 2 is a depiction of a system for instant messaging on which the present technology may be implemented.

The novel computing device 100 may operate within a system such as the exemplary communication system shown in FIG. 2. In this communication system, a variety of different types of computing devices 100 are shown to underscore that this technology may be employed by different types of devices, not just the mobile device illustrated by way of example in FIG. 1. As shown in FIG. 2, wired computing devices 100 (e.g. desktop computers, laptop computers etc.) communicate via data network 200, e.g. the Internet. Wireless computing devices 100 (e.g. handheld mobile devices, tablets, etc.) communicate via wireless network 210 which is, in turn, connected to the data network 200. An instant messaging client on computing device 100 may enter into an IM session via IM server 220. Each of the devices 100 may act as a sending device that sends an IM to set up a reminder on a recipient device. Each of the devices 100 may also act as the recipient device that receives the IM and sets up the reminder.

Location data for determining whether the location-based condition is met may be derived from a GPS receiver that receives signals from orbiting GPS satellites (shown by way of example in FIG. 2). Other position-determining technologies may be used, e.g. Wi-Fi™ positioning based on signals received from Wi-Fi hotspots, cellular signal triangulation, cell tower identity, etc. Depending on the granularity of the location condition (e.g. city, province, country, etc.), the identity of the base station tower may be sufficient. If the location condition is precise, e.g. a particular address, intersection, landmark, etc., then a more accurate position fix will be required such as a GPS position fix.

Time data for determining whether a time-based condition is satisfied may be obtained from any one of a number of possible sources including, for example, an internal clock on the device, network time or from GPS signals.

Proximity data for determining whether a device associated with a contact or buddy is within a predetermined distance threshold of the computing device may be obtained by a location-tracking server that stores and updates location data for the contacts or buddies. Alternatively, proximity may be determined by using wireless short-range communication means. For instance, if one device is paired to another device via Bluetooth®, each paired device is aware of the presence of the other device whenever they share the same location.

Proximity may also be determined from a contact's advertised location status. A contact may explicitly update her location status, for instance, by changing her IM status to "at work" or by scanning an NFC tag used to "sign in" to a location (such as a coffee shop)

Another proximity detection means is to rely on a calendar event shared by two users. For example, if two users are scheduled (in a calendar or other scheduling application) to attend the same meeting or event, the device can infer with a reasonable expectation of accuracy that the user and her contact will both be present at the same location at the same time.

Figure 3:
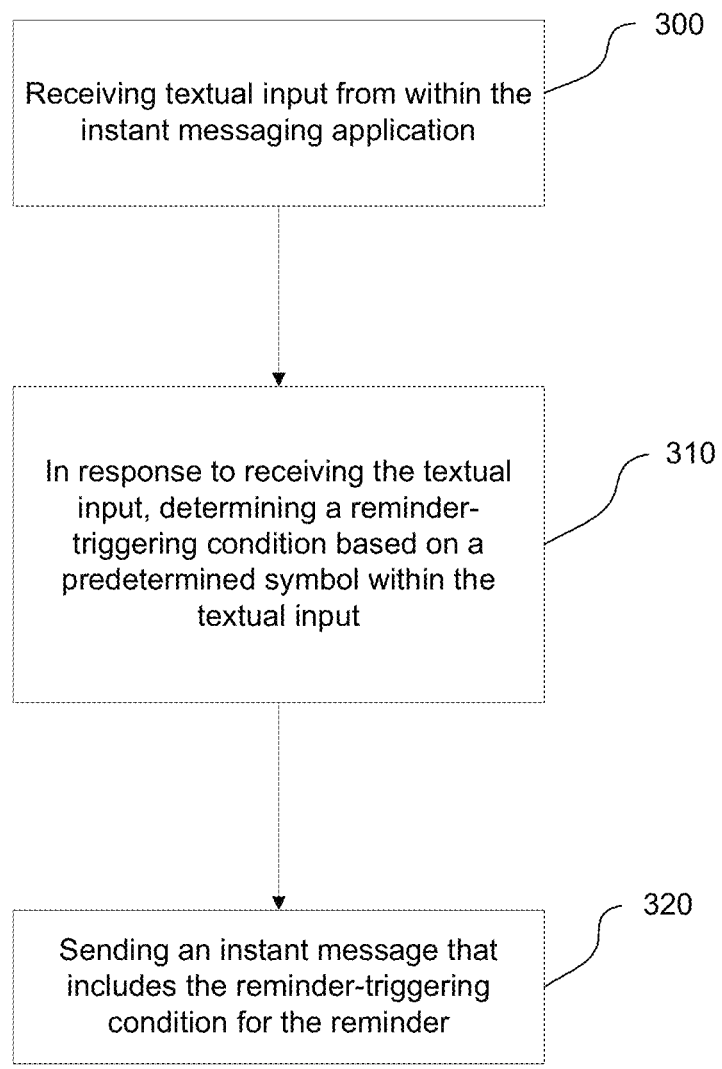
FIG. 3 is a flowchart depicting steps of a method performed by a computing device in accordance with one implementation of the present technology.

The present technology also provides a novel method for a computing device to provide reminders from within an instant messaging application. As depicted by way of example in FIG. 3, the method includes a step 300 of receiving textual input from within the instant messaging application. In response to receiving the textual input, the method then involves a step 310 of determining a reminder-triggering condition based on a predetermined symbol within the textual input. This determining of the condition may be accomplished by parsing the textual input to detect the predetermined symbol. The predetermined symbol may be any predefined symbol or character, or any predefined combination or string of symbols or characters. Referring still to FIG. 3, the method then involves a step 320 of sending an instant message to a recipient device wherein the IM includes data for a reminder-triggering condition for setting up a reminder on the recipient device.

Figure 5:
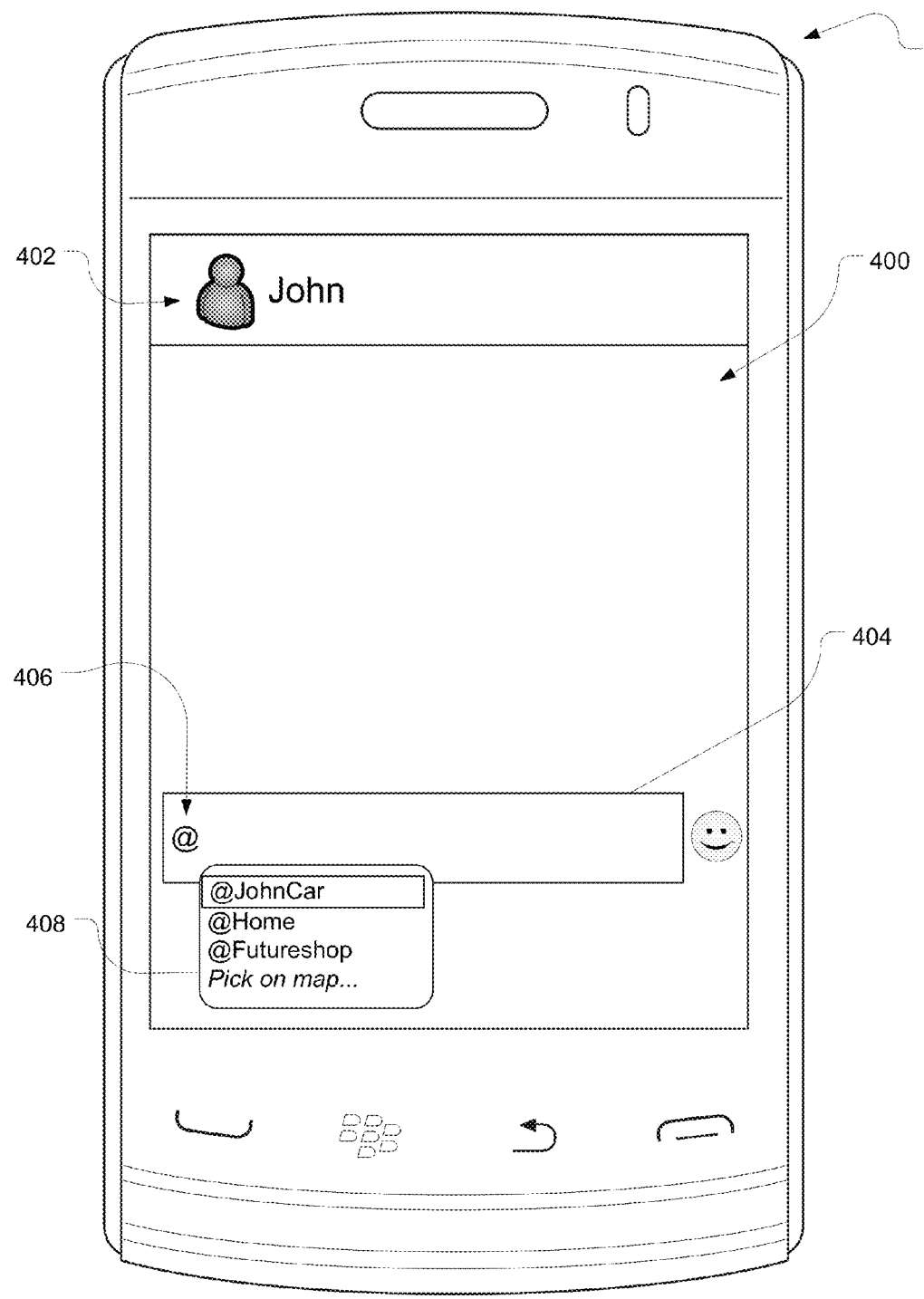
FIG. 5 depicts an example of a drop-down menu or list of preset locations displayed in response to the receipt of the predetermined symbol shown in FIG. 4.

In one implementation, the method entails steps of providing a list, drop-down menu, or equivalent of preset reminder-triggering conditions in response to detecting the predetermined symbol. An example of such a menu is depicted in FIG. 5. The method includes receiving selection input (from the user composing the IM) to select one reminder-triggering condition from the list of preset reminder-triggering conditions. The list of preset reminder-triggering conditions may be a list of preset locations from which a location is selected for providing a location-based reminder. The list of preset reminder-triggering conditions may be a list of contacts for providing a proximity reminder based on a proximity of a current position of the computing device to a selected contact. Alternatively, the list may be a hybrid list of both locations and contacts. The list may be in the form of a directory with categories and subcategories of locations, contacts, etc. For example, locations may be arranged geographically by country, then province, then city, then neighbourhood or the locations may be arranged thematically, e.g. restaurants, hotels, parks, etc. Contacts may also be categorized by family, work/business, friendship, clubs, communities, etc.

As a further alternative, the specifying of a contact or location may be done without a list being presented. For example, the device may be configured to recognize geographical entities when the entity is typed in associated with the predetermined symbol. For example, textual input "@Montreal" would cause the device to set a location-based reminder for the city of Montreal. Contacts may be looked up in real-time from an address book. For example, "@William" would cause the device to look up any contacts stored in the address book that contain the name William. As another example of selection without a drop-down menu, the UI may enable the user to speak the name of the location, contact or time as a means for setting the IM-communicated reminder.

Time-based reminders may also be created quickly and intuitively using predetermined symbols that are typed into the IM message field. For example, numeric input associated with a predetermined symbol may be used to create a time-based reminder. For example, @6 pm might be used to create a reminder for 6 p.m. In a variant, a 24-hour system may be used to obviate the need to enter "pm" or "am". For example, @20 would generate a reminder for 8 p.m. Note how the same predetermined symbol @ may be used to set either time-based reminders or location-based reminders although, in a variant, different symbols may be used for setting time-based and location-based reminders.

In one implementation, the device parses textual input as it is typed. In response to detecting textual input containing a first predetermined symbol (e.g. an @ key) followed immediately by numeric input, the device generates a time-based reminder-triggering condition. In response to detecting textual input containing the same first predetermined symbol (the @ key) but followed immediately by alphabetic (i.e. non-numeric) input, the device generates a location-based reminder-triggering condition. In response to receiving textual input containing a second predetermined key (e.g. an & key), the device generates a contact-proximity-based reminder-triggering condition. The @ and & keys are presented solely to illustrate one exemplary way of implementing this technology; other symbols may be of course utilized.

To further illustrate and explain the technology, various examples will now be presented with reference to FIG. 4 to FIG. 16.

Figure 4:
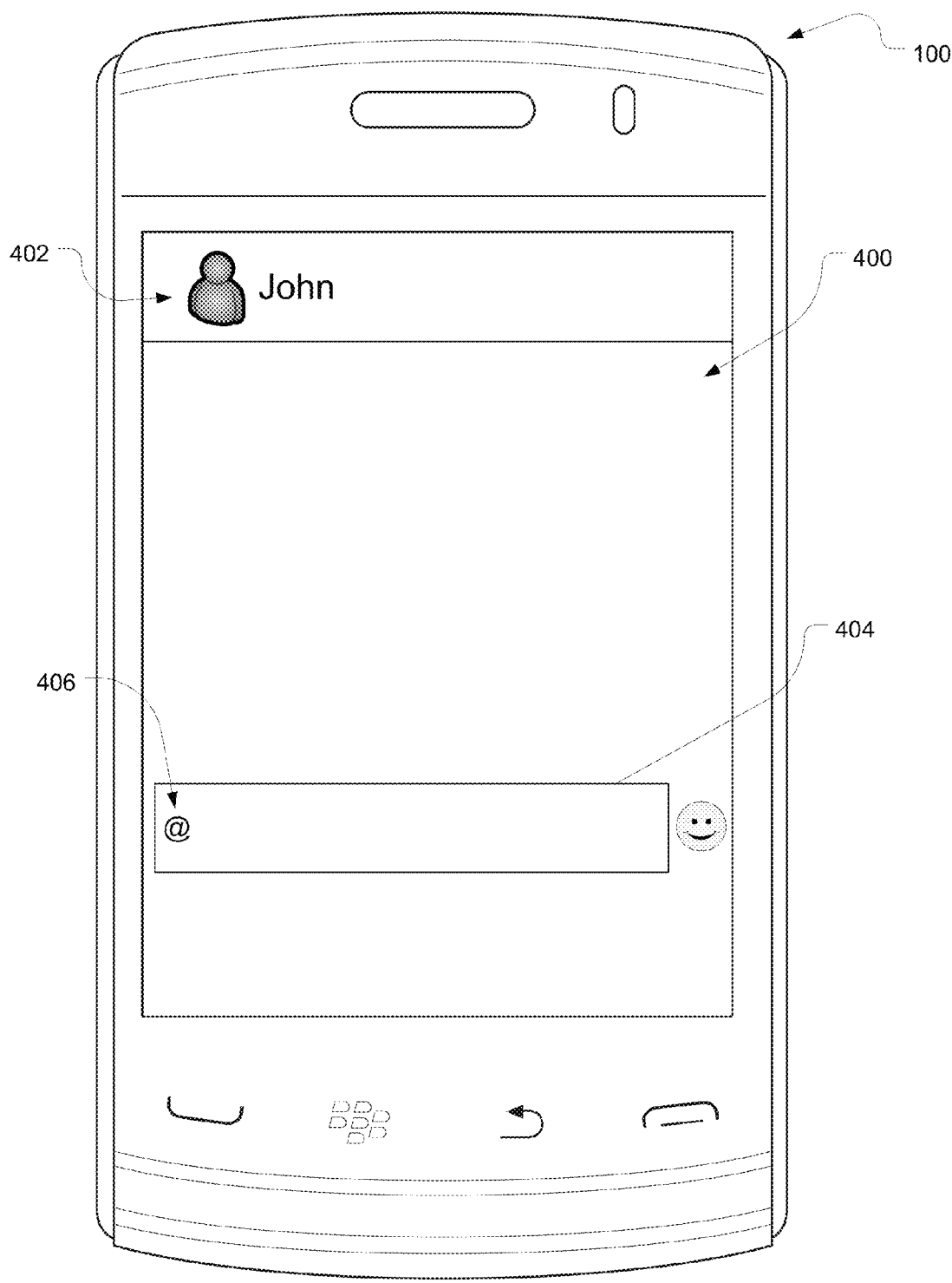
FIG. 4 depicts an example of a predetermined symbol being input into a text field of an instant messaging application executing on a computing device.

FIG. 4 depicts an example of a predetermined symbol (e.g. an @ symbol) 406 being input into a text field 404 of an instant messaging (IM) application executing on a computing device 100. The IM application interface 400 may include, as shown solely by way of example, a contact/buddy name (e.g. John) 402 with an optional icon, avatar or photo of the contact/buddy. As noted above, in one main implementation, by parsing the text being input, the predetermined symbol @ is detected. This causes the device to define a reminder-triggering condition based on the symbol and any associated textual input. One exemplary way of defining the reminder-triggering condition is to use a drop-down menu or list of preset reminder-triggering conditions.

FIG. 5 depicts an example of such a drop-down menu or list. In this example, the drop-down menu is a list 408 of preset locations displayed in response to the receipt of the predetermined symbol 406. In one specific implementation, the list of preset locations may include an option to select a map location on a map displayed on the computing device ("Pick on Map . . . "). In this example, the user selects @JohnCar as the selected location.

Figure 6:
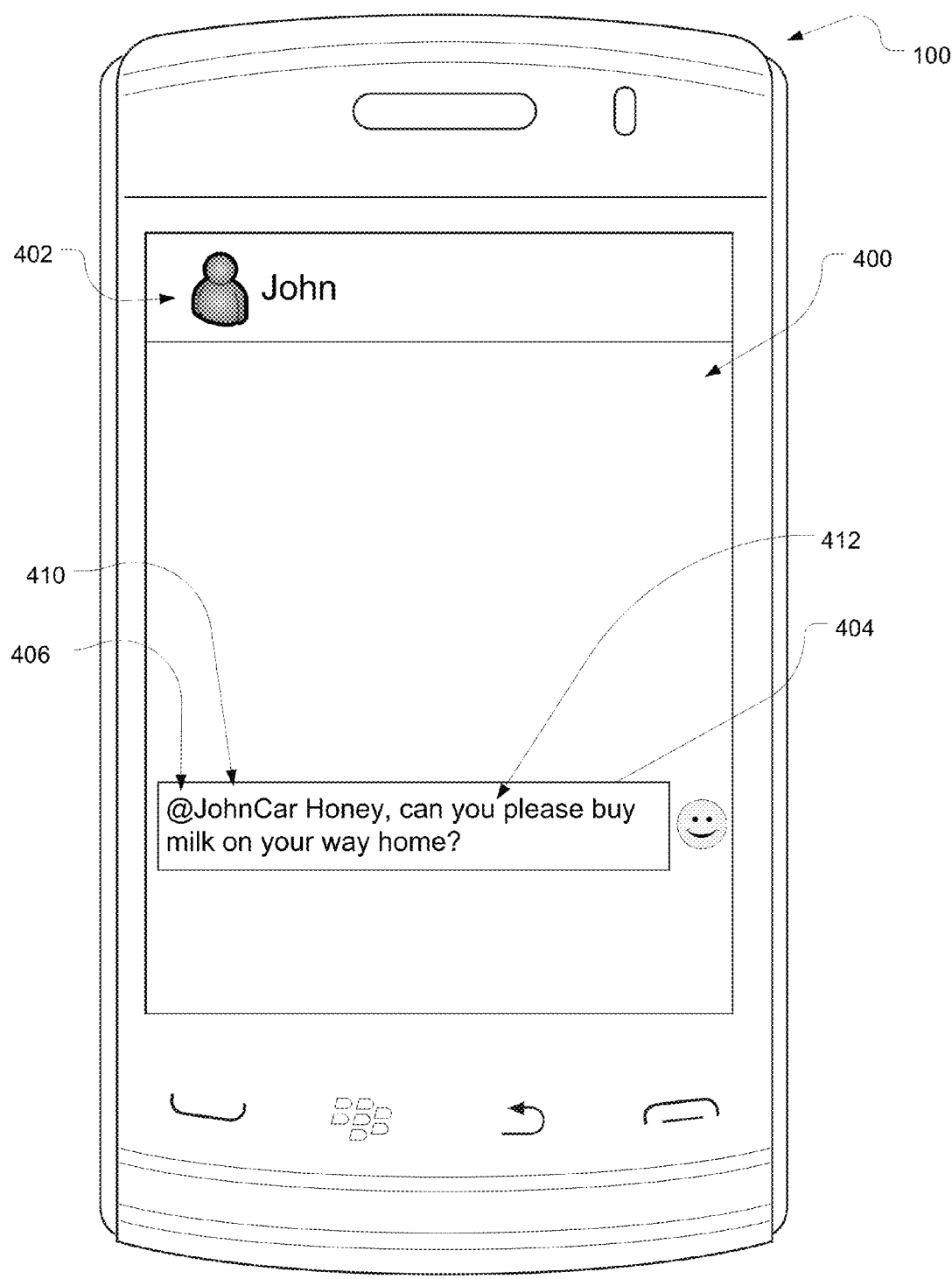
FIG. 6 depicts an example of a reminder message for a location that has been selected from the list of preset locations shown in FIG. 5.

FIG. 6 depicts the IM application interface after the user has composed a reminder message for her contact/buddy John ("Honey, can you please buy milk on your way home?"). This reminder message is the message that sender Kate wishes to provide to John as part of a location-based reminder to be triggered upon satisfaction of a location-based condition associated with @JohnCar. In other words, when John (with his device) returns to his car, the reminder will be provided to John. The reminder message entered by Kate will be displayed as part of that reminder.

Figure 7:
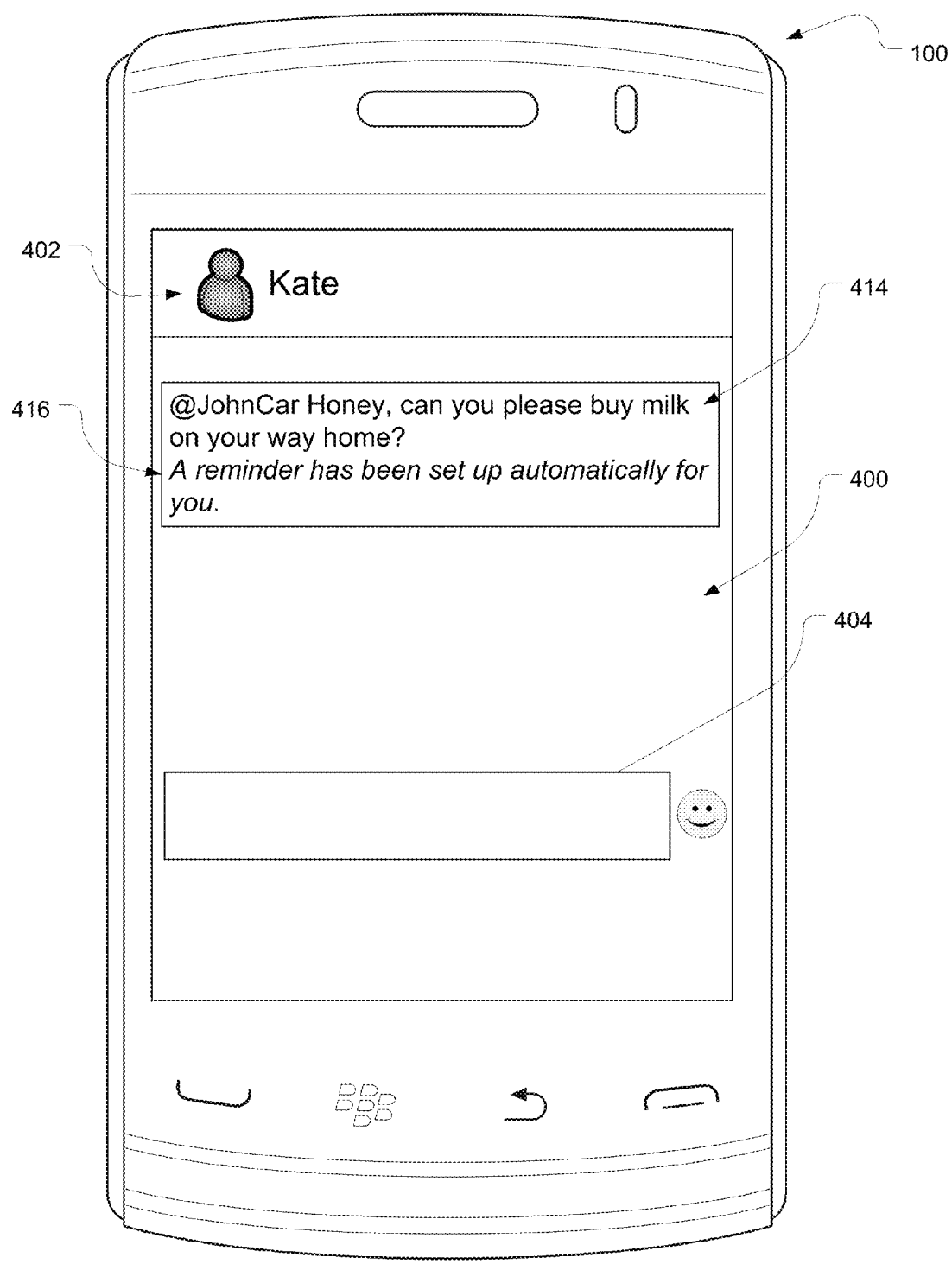
FIG. 7 depicts an example of an instant messaging interface on the receiving device that has received the instant message.

FIG. 7 depicts an example of an instant messaging interface 400 on the receiving device (John's device) that has received the instant message from Kate. In the example depicted in FIG. 7, the IM interface 400 includes a text field 404, a sent/received messages pane 414 showing messages that have been sent and received. In this sent/received messages pane 414 is the IM received from Kate "@JohnCar Honey, can you please buy milk on your way home?" The @JohnCar tag may be absent in a variant. In addition, as shown by way of example, is a reminder set-up notification 416 that notifies the recipient that a reminder has been automatically set up.

Optionally, the IM interface may provide a user interface element (virtual button, link, etc.) to view, edit and/or delete the reminder.

In the illustrated example, the reminder text is stored on the recipient device with the reminder-triggering condition as part of the reminder data while the same reminder text appears in the received IM shown in the pane 414. In a variant, the pane 414 does not display the reminder text as part of the received IM, thereby presenting this text only once when the reminder is triggered.

Figure 8:
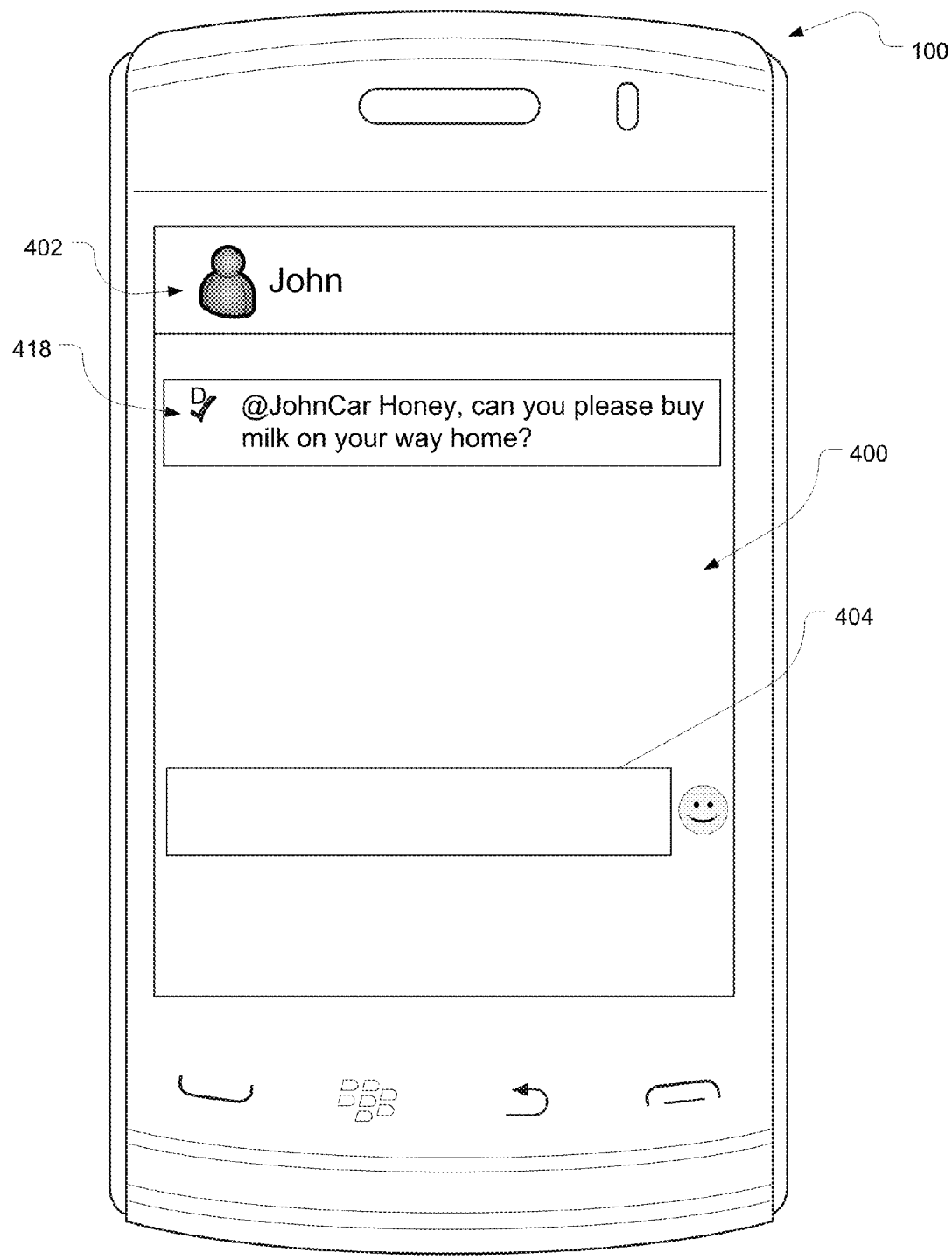
FIG. 8 depicts an example of an instant messaging interface on the sending device that has sent the instant message.

FIG. 8 depicts an example of an instant messaging interface 400 on the sending device that has sent the instant message. In this example, the IM 418 ("@JohnCar Honey, can you please buy milk on your way home?") appears with a checkmark and a small letter D to indicate that the IM has been delivered. These letters (e.g. D) are merely illustrative of one specific implementation. It bears emphasis that other letters may be used (or, in another implementation, these letters may be omitted altogether).

Upon satisfaction of the reminder-triggering condition, the reminder set up by Kate's IM is provided to John, i.e. John's device presents the reminder to John (as visual, audible and/or vibratory output). Determining that the reminder-triggering condition is satisfied may be accomplished in a variety of ways, e.g. using detection processes that involve GPS, NFC, Bluetooth®, etc. For example, John may tap an NFC tag whenever he enters his car as a means to confirm his current location. As another example, a GPS system on his device may recognize that he has returned to the same location where he had previously parked his car on his way to work. In another example, Bluetooth® pairing of John's mobile device with a car-mounted Bluetooth® accessory may also be used as an indication of his location.

Figure 9:
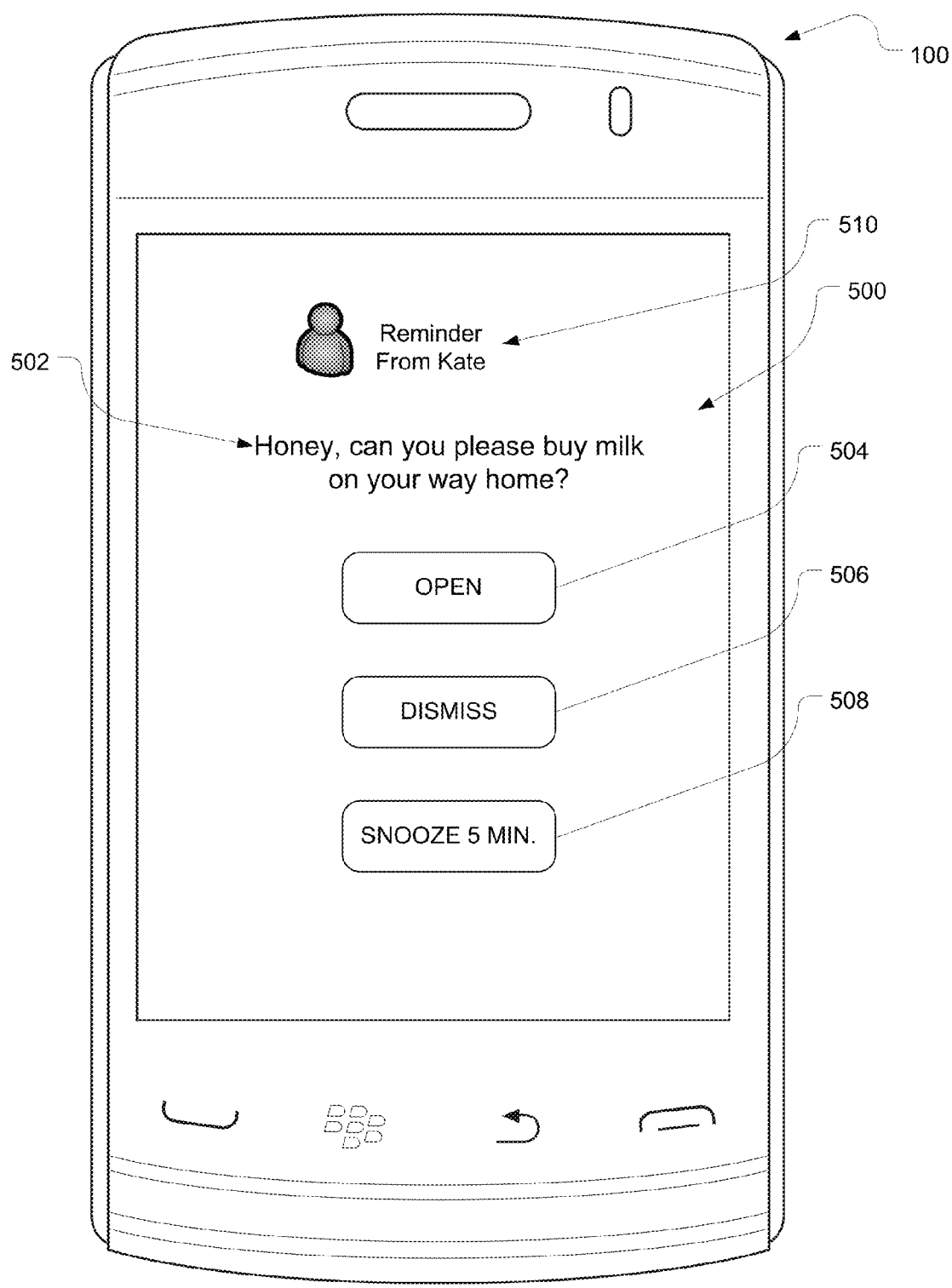
FIG. 9 depicts an example reminder that is displayed on the receiving device on satisfaction of the reminder condition.

FIG. 9 depicts an example reminder interface 500 that is displayed on the receiving device 100 on satisfaction of the reminder condition which, in this case, is location-based. In this example, the interface 500 includes a reminder message 502 or reminder text ("Honey, can you please buy milk on your way home?"). The reminder interface 500 may include user interface elements to open the reminder (UI element 504), to dismiss the reminder (UI element 506) or to snooze for a predetermined period of time, e.g. snooze for 5 more minutes (UI element 508). The user interface 500 may include an indication as to the reminder source 510 (e.g. "Reminder from Kate"). An alternative implementation is to display a new message at the bottom of the IM stream that repeats the reminder and optionally displays it in red, capital letters, or with some other form of emphasis. In a variant, an IM notification icon (that indicates that a new IM has been received) could also be made to change colour, become highlighted or otherwise emphasized. For example, the notification icon may turn one colour, e.g. red instead of blue, whenever the notification is a reminder (as opposed to a mere textual message or line of ongoing conversation).

Figure 10:
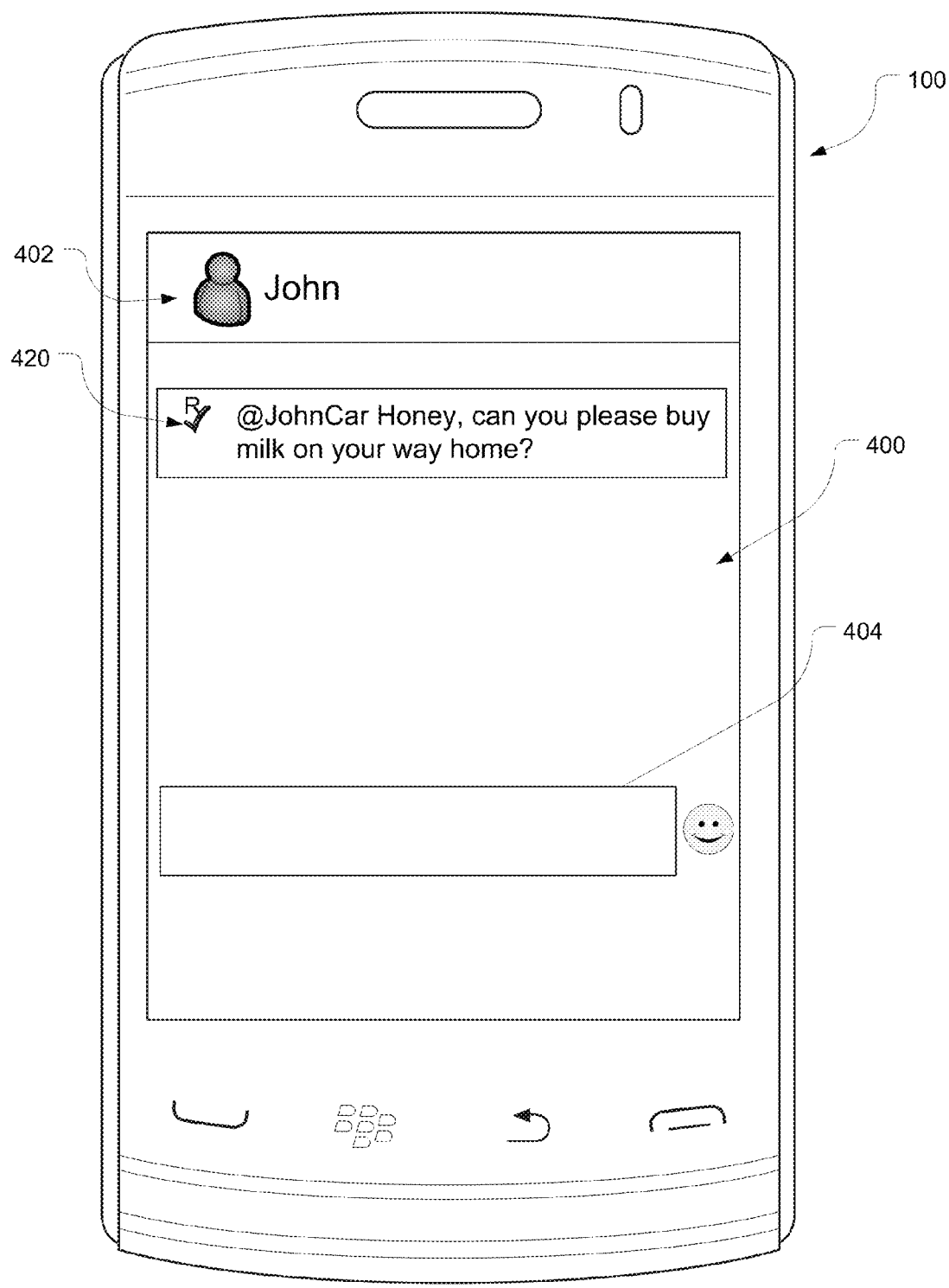
FIG. 10 depicts an example of the instant messaging interface of the sending device once the reminder has been read.

FIG. 10 depicts an example of the instant messaging interface 400 of Kate's sending device once the reminder has been read/received by John. This reminder confirmation indicates to Kate that her IM reminder has been provided to John. This reminder confirmation 420 may include, for example, a checkmark with the little letter R beside the transcript of the sent message in the pane 414. Optionally, the reminder confirmation returned to the sending device may include further details as to whether the recipient opened the reminder, dismissed the reminder, delayed the reminder using the snooze function, or viewed, edited or deleted the reminder. Optionally, a confirmation message is returned to the sending device when the conditions for the reminder are met on the recipient's device and the reminder has been triggered. Alternatively, in a variant, instead of the confirmation message, the small letter D or R could be changed to T (for "triggered").

Figure 11:
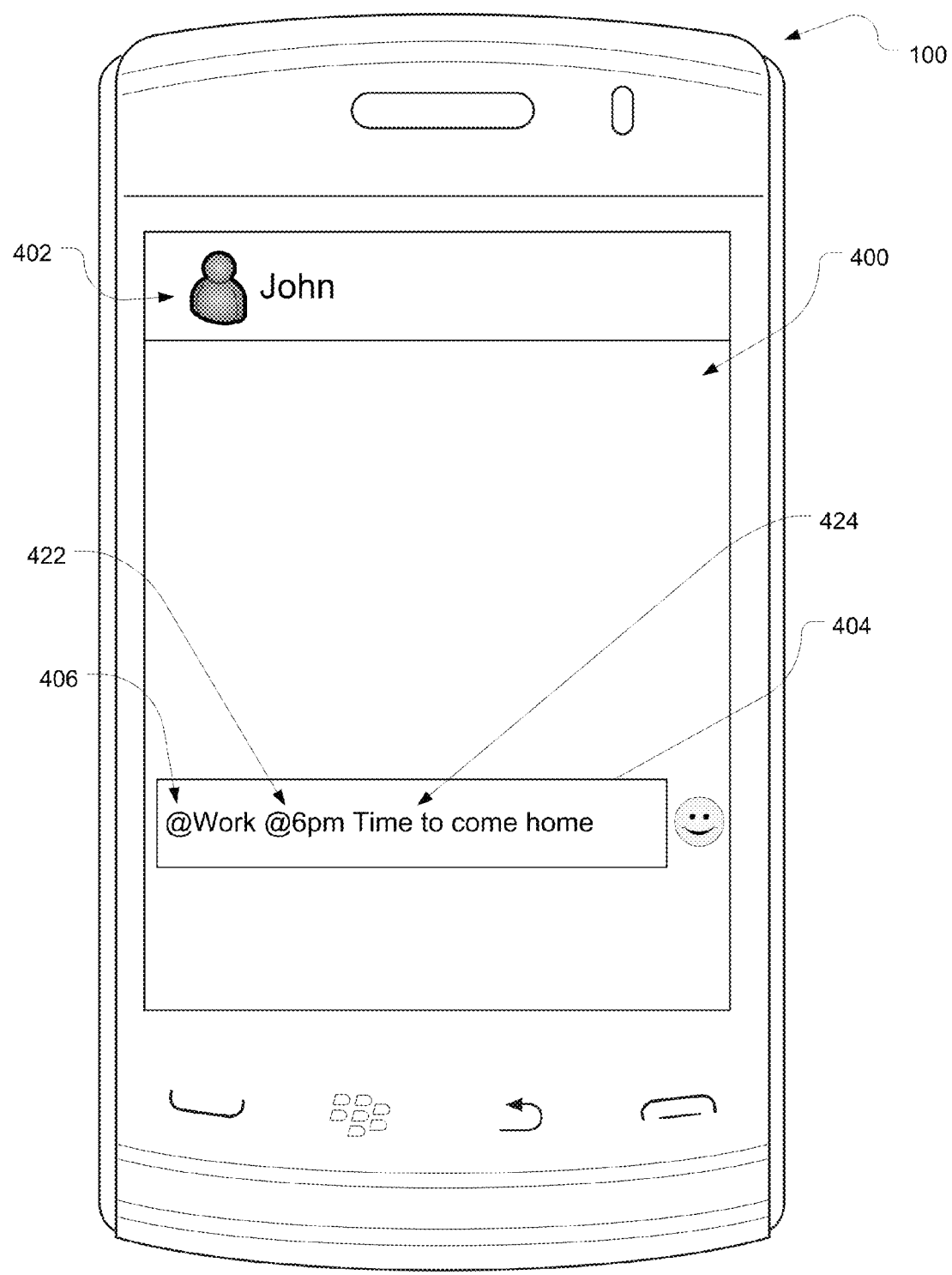
FIG. 11 depicts, by way of example, the setting of a location-based and time-based reminder.

Other types of reminder conditions may be created, including reminders based on complex or compound conditions. For example, FIG. 11 depicts the setting of a reminder that is both location-based and time-based. This may be accomplished intuitively by user input of predetermined symbols (e.g. "@") in the text field 404 of the IM interface 400. The predetermined symbols (e.g. "@") are quick to input, easy to remember and do not detract from or interfere with the overall IM user experience. In the illustrated example of FIG. 11, the user Kate creates a location-based condition ("@Work") in combination with a time-based condition ("@6 pm"). The location-based condition "@Work" may be selected, in the manner previously described, from a list displayed in response to input of the predetermined symbol 406 (e.g. "@"). The time-based condition is created by detecting the predetermined symbol @ in association or conjunction with (e.g. immediately followed by) numeric input 422. In this example in FIG. 11, Kate also types the reminder text 424 ("Time to come home"). The reminder text 424 may precede or follow the predetermined symbols 406, 422. It should be understood that reminder text is not strictly necessary if the user simply wishes to set a "blank" reminder that triggers at a certain time and/or place without any explanatory text.

Reminders may also be set to be triggered when the recipient device is in proximity to another contact.

Figure 12:
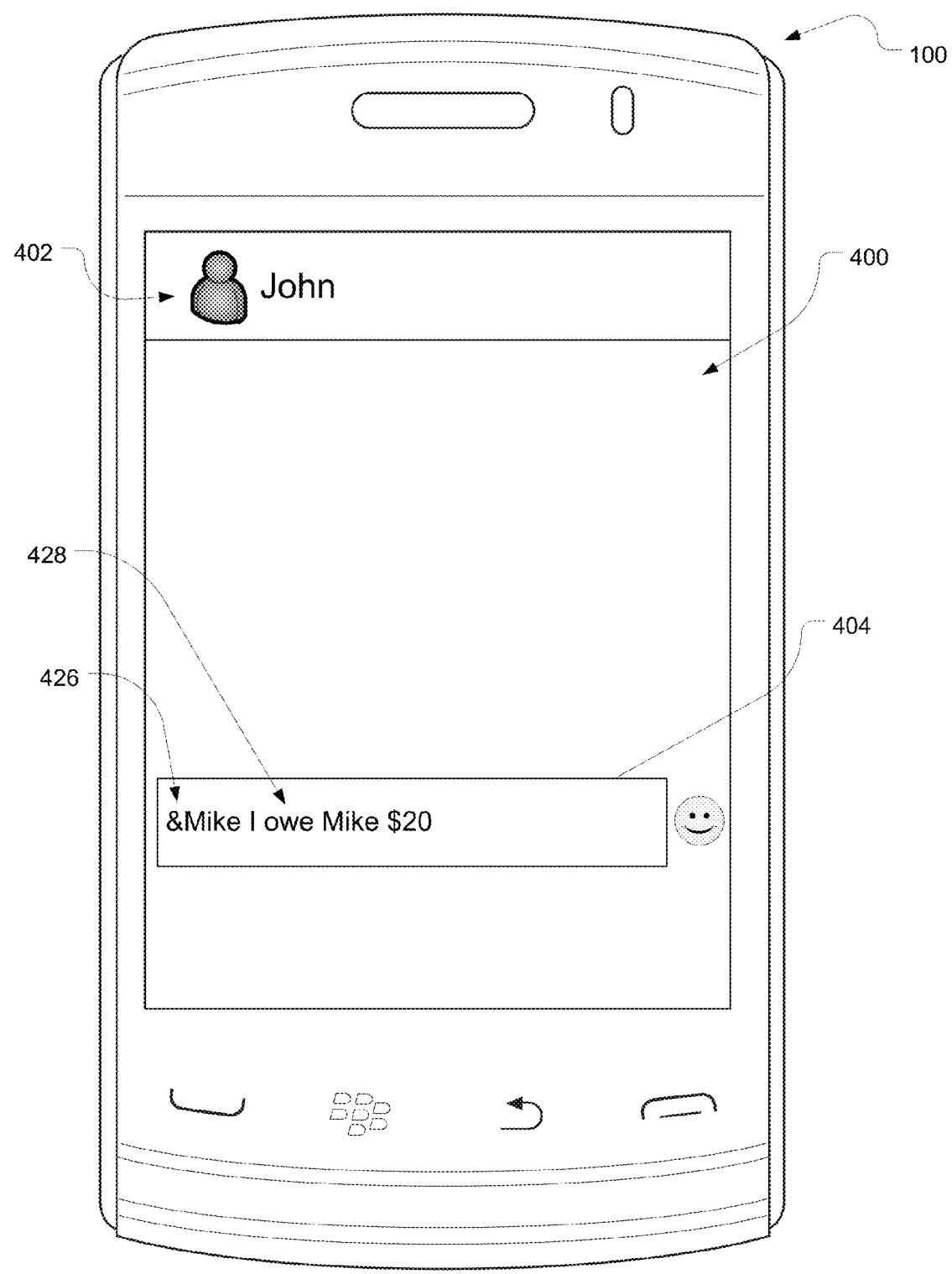
FIG. 12 depicts, by way of example, the setting of a contact-proximity-based reminder.

FIG. 12 depicts, by way of example, the setting of a contact-proximity-based reminder. In this scenario, the user Kate wishes to send John a reminder (triggered the next time that John and Mike meet or come into proximity with one another) to remind John that he owes Mike $20. This may be done quickly and intuitively using a predetermined symbol such as, for example, the & symbol although other symbols may be predefined for this purpose. Kate inputs her reminder message 428 to John ("I owe Mike $20"), for example, by typing this message into text field 404 of IM interface 400. She then sets a proximity reminder using the & symbol 426. The device recognizes this predetermined symbol by parsing the text input by Kate and creates a reminder-triggering condition for John's device. A reminder will then be provided to John when his proximity to Mike is less than a predetermined distance threshold.

Figure 13:
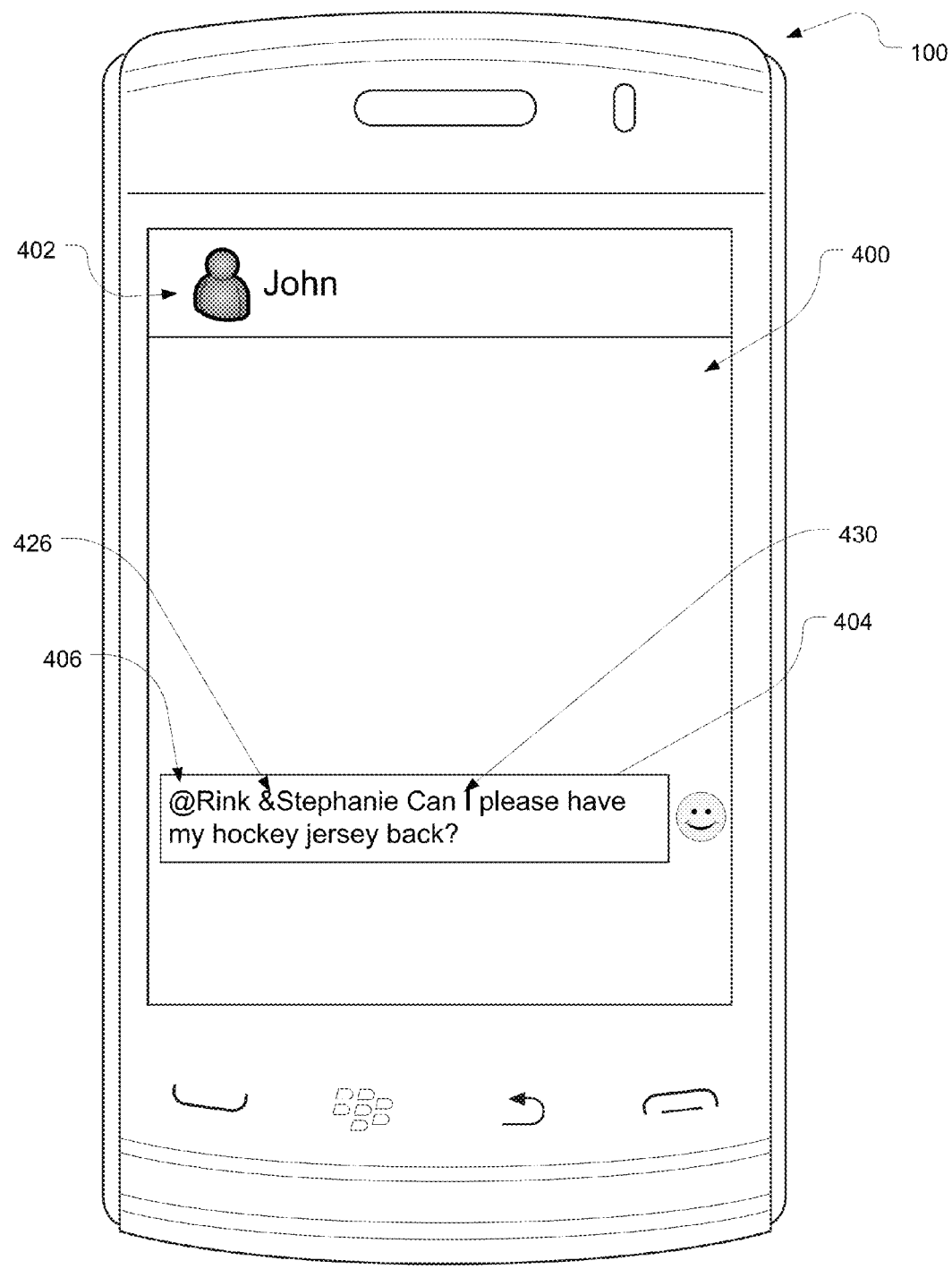
FIG. 13 depicts, by way of example, the setting of a combined location-based and contact-proximity based reminder.

FIG. 13 depicts, as a further example, the setting of a combined location-based and contact-proximity based reminder. Again, this is accomplished by inputting text into the text field 404 of the IM interface 400. The @ symbol 406 may be used as a predetermined symbol to cause the device to display a list of preset locations from which @Rink is selected. The & symbol is recognized as the predetermined symbol for setting a contact-proximity-based reminder. The device, in response to detecting the & symbol 426, displays the available contacts or buddies for whom location-sharing is possible or permissible. The user then selects &Stephanie from the list of contacts. The user may then continue to input reminder text 430 ("Can I please have my hockey jersey back?"). The next time that the John and Stephanie are both at the rink, the reminder will be provided to John.

Figure 14:
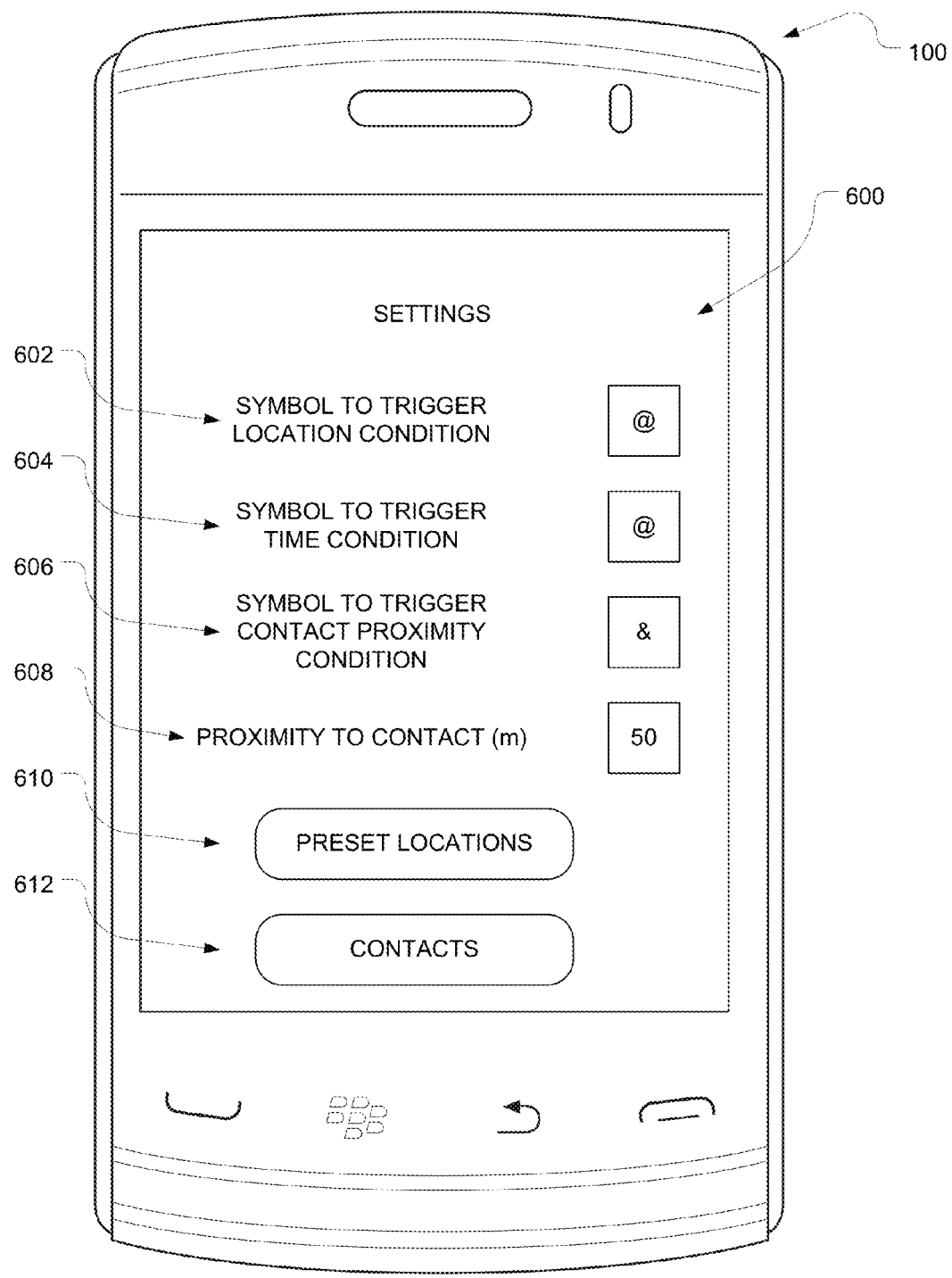
FIG. 14 depicts an example of a main settings page that may be used to configure various instant messaging reminder functions.

FIG. 14 depicts an example of a main settings page 600 that may be used to configure various instant messaging reminder functions on a computing device 100. For example, the IM settings page 600 may include a first setting 602 to edit or change the symbol used to trigger the location condition (which is defaulted to the @ symbol in this exemplary implementation). A second setting 604 enables the user to edit or change the symbol used to trigger the time condition (which is also defaulted to the @ symbol in this example). A third setting 606 enables the user to edit or change the symbol used to trigger the contact proximity condition (which is defaulted to the & symbol in this example). The predetermined distance threshold for the proximity trigger may be configured using the proximity setting 608. Preset locations may be created, edited, deleted, etc. using the preset locations button 610. Contacts may be created, edited, deleted, etc. using the contacts button 612.

Figure 15:
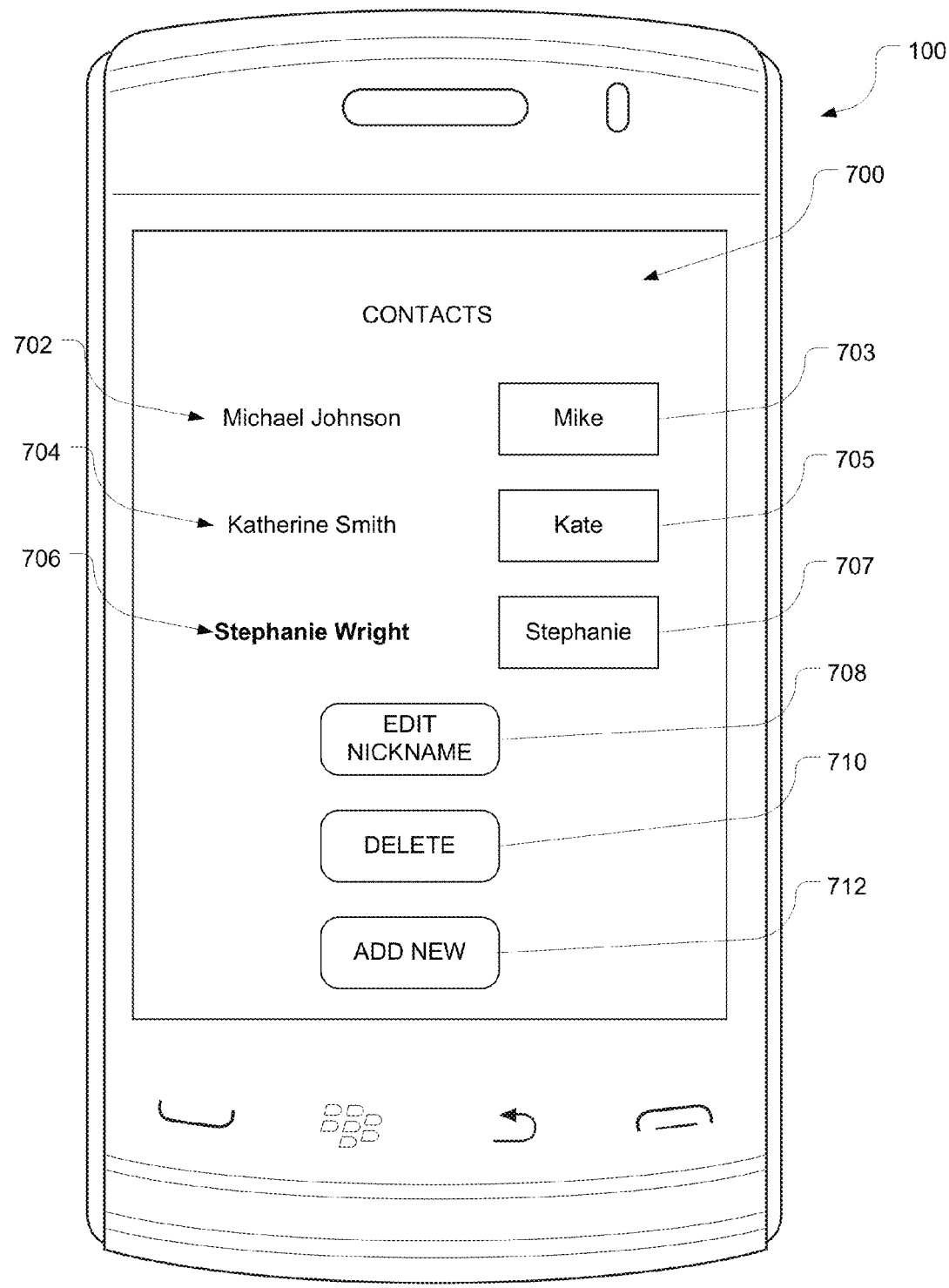
FIG. 15 depicts an example of a contact settings page that may be used to configure various aspects relating to the predefined contacts for contact-proximity based reminders.

FIG. 15 depicts an example of a contact settings page that may be used to configure various aspects relating to the predefined contacts for contact-proximity based reminders. This contacts page 700 may be accessed, for example, by providing input to the contacts button 612 of FIG. 14. The contacts page may list various contacts 702, 704, 706 with their respective nicknames 703, 705, 707 (e.g. "Mike" for "Michael Johnson", "Kate" for Katherine Smith, "Stephanie" for Stephanie Wright). User interface elements 708, 710, 712 may be provided to edit nicknames, delete contacts and add new contacts, respectively.

Figure 16:
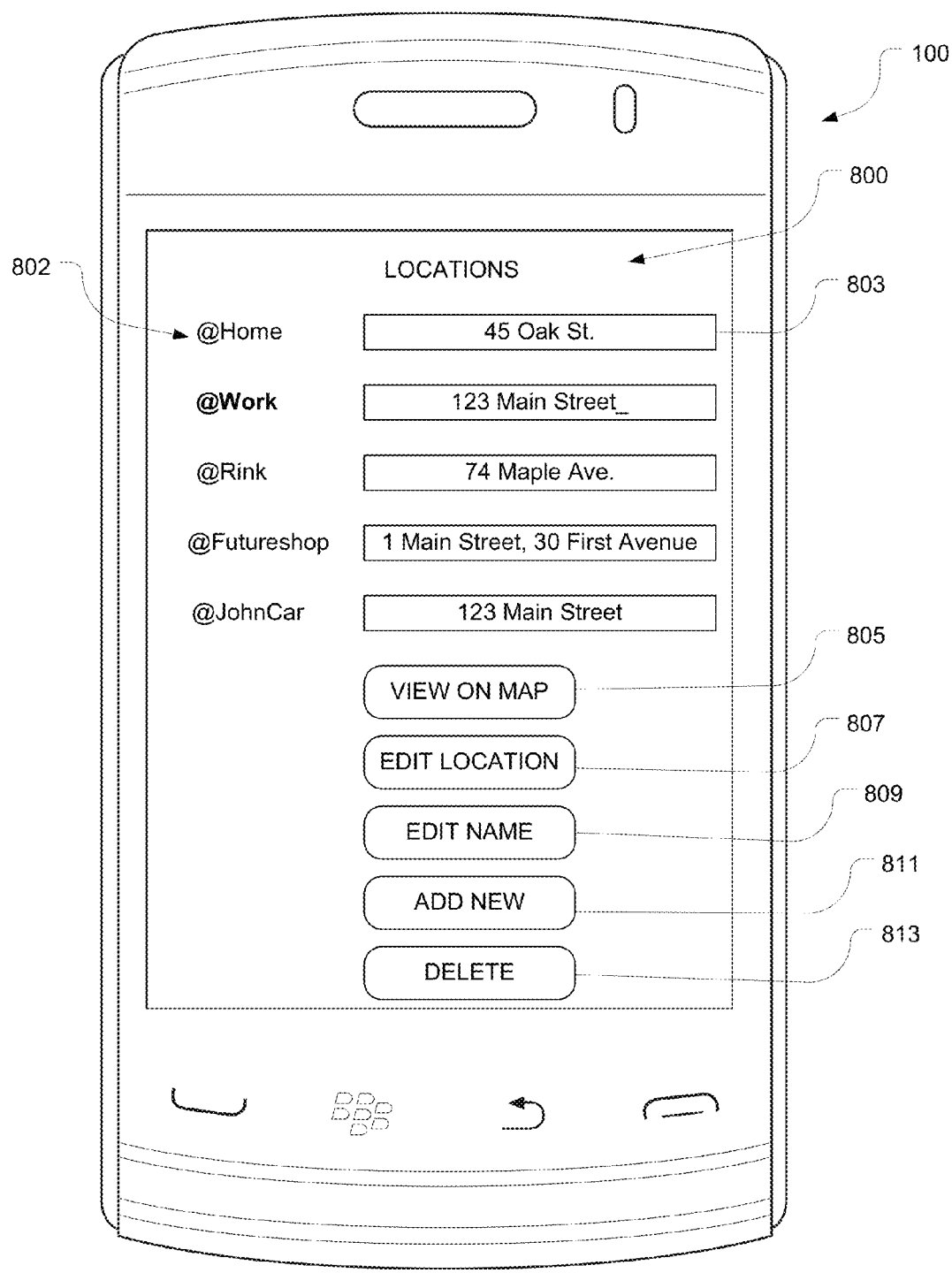
FIG. 16 depicts an example of a location settings page that may be used to configure various aspects relating to the preset locations for location-based reminders.

FIG. 16 depicts an example of a location settings page that may be used to configure various aspects relating to the preset locations for location-based reminders. This locations page 800 may be accessed, for example, by providing input to the preset locations button 610 of FIG. 14. The locations page 800 enables various preset locations 802 to be defined (e.g. @Home, @Work, @Rink, @Futureshop, @JohnCar). Optionally, location description information 803 may be associated and displayed with each location entry (e.g. an address, coordinates of longitude and latitude, city, country, etc.) Note how the location description for @Futureshop (which is an electronics store) may contain more than one address, indicating that the reminder will be triggered when the device enters any one of the stores for which location information is stored. Thus, a location tag such as @Futureshop may have multiple locations associated with it. User interface elements 805, 807, 809, 811, 813 may be provided for various functions. For example, UI element 805 enables the user to view each preset location 803 on a map, UI element 807 enables the user to edit the preset location, UI element 809 enables the user to edit the name of the preset location, UI element 811 enables the user to add (define or create) a new preset location, and UI element 813 enables the user to delete a preset location.

Certain preset locations (e.g. @Futureshop) may be created from preloaded lists of commercial establishments. The user could select a store or other commercial establishment from a dropdown menu that includes, for instance, Walmart, Costco, McDonald's, Starbucks, etc. The user can then specify a particular establishment or choose to include all or (or a subset of) the commercial establishments (within a predetermined distance or within a predetermined geographical region). These locations would then automatically be added to the location-based conditions that trigger a reminder.

As noted above, a custom location like @JohnCar may be created by causing a GPS receiver to store a location where the car is parked, by using an NFC tag, or by other such means.

Preset locations may be defined by the sending device and/or by the recipient device. In another implementation, a variety of common preset locations may be preloaded in the IM application for geographical entities, landmarks or popular public places. Private or customized preset locations (e.g. @JohnCar) that are created by the recipient device may be shared selectively with other contacts to enable those other contacts to set reminders for that location. For example, John may create the @JohnCar location when he parks his car in his parking place at work. John shares this preset location only with his wife Kate. In other words, IM contacts may thus exchange private or custom preset locations. In other implementations, IM contacts may grant conditional permission to other contacts to use the private or custom preset locations only at certain times or on certain days. For example, a first contact may only wish to receive reminders from a second contact at work but not at home and only on weekdays.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for setting a reminder from within an instant messaging application executing on a computing device, the method comprising:
   populating a list with abbreviations of reminder-triggering conditions;
   associating one or more of the abbreviations with a respective symbol, each symbol being associated with one or more abbreviations of time, location and proximity;
   detecting the symbol in one or more user input symbols, within textual input, received from direct user input to the instant messaging application;
   displaying in a drop-down menu, in response to detecting the symbol, the list of abbreviations associated with detected symbol;
   receiving selection input to select one abbreviation from the displayed drop-down menu;
   generating from within said instant messaging application, a reminder having the reminder-triggering condition corresponding to the selected abbreviation; and
   sending in an instant message from the computing device the generated reminder that includes the selected reminder-triggering condition.

2. The method as claimed in claim 1 wherein providing the list of preset reminder-triggering conditions comprises providing a list of preset locations from which a location is selected for providing a location-based reminder.

3. The method as claimed in claim 2 wherein the list of preset locations includes an option to select a map location on a map displayed on the computing device.

4. The method as claimed in claim 1 wherein providing the list of preset reminder-triggering conditions comprises providing a list of contacts for providing a proximity reminder based on a proximity of a current position of the computing device to a selected contact.

5. The method as claimed in claim 1 wherein the user input symbols being one or more non-alphanumeric characters.

6. The method as claimed in claim 1 wherein determining the reminder-triggering condition based on the predetermined symbol comprises:
   in response to receiving textual input containing a first symbol followed immediately by numeric input, generating a time-based reminder-triggering condition;
   in response to receiving textual input containing the first symbol followed immediately by alphabetic input, generating a location-based reminder-triggering condition; and
   in response to receiving textual input containing a second symbol, generating a contact-proximity-based reminder-triggering condition.

7. A non-transitory computer-readable medium comprising instructions in code which loads into a memory and executes a processor of a computing device causing the computing device to:
   populate a list with abbreviations of reminder-triggering conditions;

associate one or more of the abbreviations with a respective symbols, each symbol, being associated with one or more abbreviations of time, location and proximity;

detect the symbol in one or more user input symbols, within textual input, received from direct user input to the instant messaging application;

display in a drop-down menu, in response to detecting the symbol, the list of abbreviations associated with detected symbol; receiving selection input to select one abbreviation from the displayed drop-down menu;

generate from within said instant messaging application, a reminder having the reminder-triggering condition corresponding to the selected abbreviation; and send in an instant message from the computing device the generated reminder that includes the selected reminder-triggering condition.

8. The computer-readable medium as claimed in claim 7 wherein the code to provide the list of preset reminder-triggering conditions comprises code for providing a list of preset locations from which a location is selected for providing a location-based reminder.

9. The computer-readable medium as claimed in claim 8 wherein the code for providing the list of preset locations includes code for providing an option to select a map location on a map displayed on the computing device.

10. The computer-readable medium as claimed in claim 7 wherein the code to provide the list of preset reminder-triggering conditions comprises code for providing a list of contacts for providing a proximity reminder based on a proximity of a current position of the computing device to a selected contact.

11. The computer-readable medium as claimed in claim 7 wherein the user input symbols being one or more non-alphanumeric characters.

12. The computer-readable medium as claimed in claim 7 wherein the code for determining the reminder-triggering condition based on the predetermined symbol comprises:

code for generating a time-based reminder-triggering condition in response to receiving textual input containing a first symbol followed immediately by numeric input;

code for generating a location-based reminder-triggering condition in response to receiving textual input containing the first symbol followed immediately by alphabetic input; and code for generating a contact-proximity-based reminder-triggering condition in response to receiving textual input containing a second symbol.

13. A computing device comprising:

a memory for storing data for an instant messaging application;

a processor operatively coupled to the memory that executes the instant messaging application;

a user interface for receiving textual input for the instant messaging application, wherein the processor is configured to:

populate a list with abbreviations of reminder-triggering conditions;

associate one or more of the abbreviations with a respective symbol, each symbol being associated with one or more abbreviations of time, location and proximity;

the processor further configured to:

detect the symbol in one or more user input symbols, within textual input, received from direct user input to the instant messaging application;

display in a drop-down menu, in response to detecting the symbol, the list of abbreviations associated with detected symbol;

receive selection input to select one abbreviation from the displayed drop-down menu;

generate from within said instant messaging application, a reminder having the reminder-triggering condition corresponding to the selected abbreviation;

and a transceiver in the computing device for transmitting in an instant message the generated reminder that includes the selected reminder-triggering condition.

14. The computing device as claimed in claim 13 wherein the preset reminder-triggering conditions comprise preset locations from which a location is selected for providing a location-based reminder.

15. The computing device as claimed in claim 13 wherein the preset reminder-triggering conditions comprise contacts for providing a proximity reminder based on a proximity of a current position of the computing device to a selected contact.

16. The computing device as claimed in claim 13 wherein the user input symbols being one or more non-alphanumeric characters.

17. The computing device as claimed in claim 13 wherein the processor is configured to cause the computing device to:

in response to receiving textual input containing a first symbol followed immediately by numeric input, generate a time-based reminder-triggering condition;

in response to receiving textual input containing the first symbol followed immediately by alphabetic input, generate a location-based reminder-triggering condition; and in response to receiving textual input containing a second symbol, generate a contact-proximity-based reminder-triggering condition.

\* \* \* \* \*